(12) United States Patent
Himmelstoss et al.

(10) Patent No.: US 9,063,213 B2
(45) Date of Patent: Jun. 23, 2015

(54) FMCW RADAR SYSTEM AND INTERFERENCE RECOGNITION METHOD FOR FMCW RADAR SYSTEMS

(75) Inventors: Armin Himmelstoss, Weissach im Tal (DE); Juergen Hildebrandt, Weilheim (DE); Stefan Heilmann, Vaihingen/Enz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 350 days.

(21) Appl. No.: 13/554,045

(22) Filed: Jul. 20, 2012

(65) Prior Publication Data

US 2013/0021196 A1    Jan. 24, 2013

(30) Foreign Application Priority Data

Jul. 22, 2011  (DE) .......................... 10 2011 079 615

(51) Int. Cl.
  *G01S 7/02* (2006.01)
  *G01S 13/34* (2006.01)
  *G01S 13/93* (2006.01)
(52) U.S. Cl.
  CPC ................ *G01S 7/023* (2013.01); *G01S 13/34* (2013.01); *G01S 13/931* (2013.01)
(58) Field of Classification Search
  CPC ........ G01S 13/32; G01S 7/023; G01S 13/931
  USPC .................................................. 342/159, 200
  See application file for complete search history.

(56) References Cited

U.S. PATENT DOCUMENTS

| | | | | |
|---|---|---|---|---|
| 4,622,554 A | * | 11/1986 | Gellekink et al. | 342/67 |
| 6,094,160 A | | 7/2000 | Lajiness | |
| 7,403,153 B2 | * | 7/2008 | Kelly et al. | 342/159 |
| 7,683,827 B2 | * | 3/2010 | Kelly et al. | 342/159 |
| 8,412,109 B2 | * | 4/2013 | Voutilainen et al. | 455/67.11 |
| 8,581,774 B2 | * | 11/2013 | Heilmann et al. | 342/26 R |
| 2006/0125682 A1 | | 6/2006 | Kelly, Jr. et al. | |
| 2007/0018886 A1 | | 1/2007 | Watanabe et al. | |
| 2011/0298656 A1 | * | 12/2011 | Bechler | 342/26 R |

FOREIGN PATENT DOCUMENTS

| | | | | |
|---|---|---|---|---|
| JP | 05107351 A | * | 4/1993 | G01S 13/34 |
| JP | 2002 168947 | | 6/2002 | |

* cited by examiner

*Primary Examiner* — Matthew M Barker
(74) *Attorney, Agent, or Firm* — Kenyon & Kenyon LLP

(57) ABSTRACT

An FMCW radar system is provided having a transceiver unit which is designed to transmit radar signals, which are modulated with the aid of at least one modulation parameter, and to receive radar signals, which are reflected from objects, and having an interference detector for detecting interferences in the received radar signals based on at least one frequency-dependent reception power threshold value corresponding to the particular modulation parameters, one of the modulation parameters being a modulation slope of the transmitted radar signal. An interference recognition method is also provided.

8 Claims, 2 Drawing Sheets

FMCW RADAR SYSTEM AND INTERFERENCE RECOGNITION METHOD FOR FMCW RADAR SYSTEMS

CROSS REFERENCE

The present application claims the benefit under 35 U.S.C. §119 of German Patent Application No. DE 102011079615.0 filed on Jul. 22, 2011, which is expressly incorporated herein by reference in its entirety.

FIELD OF THE INVENTION

The present invention relates to radar systems in general. In particular, the present invention relates to FMCW radar systems and interference recognition methods for FMCW radar systems.

BACKGROUND INFORMATION

FMCW radar systems are presently used in a plurality of applications. For example, FMCW radar systems, in particular, may be used in motor vehicles. FMCW radar systems in motor vehicles are, for example, used to detect objects which are located in the surroundings of the motor vehicle. The data received by the FMCW radar systems regarding objects which are located around the vehicle may then be used, for example, for automatic cruise control of a motor vehicle.

FMCW radar systems make it possible to determine a speed and a distance of an object relative to the FMCW radar system. For this purpose, multiple modulations are transmitted by the radar and the reflected radar signals are evaluated. A series of transmitted modulations (radar signals) is referred to as a sequence. Here, the individual modulations are each characterized by different modulation parameters, in particular by a modulation slope of the transmission frequency. For example, a modulation may have a modulation slope of 400 MHz/ms.

For object recognition, usually a plurality of modulations of radar signals is transmitted. The modulations may have identical or different modulation parameters.

Since radar systems are in general based on transmitting electromagnetic waves and detecting and evaluating the reflections of these transmitted electromagnetic waves from objects, radar systems are susceptible to interferences of other radar systems. Interferences are mutual disruptions of radar systems. Interferences may, for example, delimit the sensitivity of a radar sensor or have an influence on its detection range. Furthermore, an interference may result in an erroneous recognition or non-recognition of objects.

In modern radar systems, methods for detecting interferences are thus used.

U.S. Published Patent Application No. US 2007/0018886 A1 describes an interference recognition method in which interferences are detected based on a rate of change of the amplitude of the received radar signal.

Furthermore, Japanese Patent Application No. JP 2002 168947 (A) describes a method for interference recognition in which a threshold value is established for the output signal of a mixer of a receiver unit. If the level of the output signal exceeds the threshold value, an interference is assumed. The threshold value is determined as a function of a relative speed or a distance between the radar system and a detected object.

SUMMARY

The present invention relates to an FMCW radar system and an interference recognition method for FMCW radar systems.

An example FMCW radar system is provided having a transceiver unit which is designed to transmit radar signals, which are modulated with the aid of at least one modulation parameter, and to receive radar signals, which are reflected from objects, and having an interference detector for detecting interferences in the received radar signals based on at least one frequency-dependent reception power threshold value corresponding to the particular modulation parameters, one of the modulation parameters being a modulation slope of the transmitted radar signal.

An example interference recognition method for FMCW radar systems is provided having the steps of providing an FMCW radar system according to the present invention; transmitting radar signals which are modulated with the aid of at least one modulation parameter; receiving radar signals which are reflected from objects; detecting interferences in the received radar signals based on at least one frequency-dependent reception power threshold value corresponding to the particular modulation parameters, one of the modulation parameters being a modulation slope of the transmitted radar signal.

In accordance with the present invention, a reception power of radar signals usually does not exceed certain maximum values for actual existing objects.

According to the present invention, an interference recognition is carried out based on the threshold values for the reception power of radar signals, the reception power threshold values being determined with the aid of at least one modulation slope of the transmitted radar signal. For this purpose, a signature or a set of frequency-dependent reception power threshold values, which indicate a reception power threshold value for each of the frequencies occurring in the particular modulation, is determined for any given modulation slope.

If a set of frequency-dependent reception power threshold values is determined for each modulation slope, a very effective and simple interference recognition is possible. One individual set of frequency-dependent reception power threshold values makes it possible to determine for one modulation whether an interference has occurred within the modulation.

Here, an interference may be detected for individual frequencies of a modulation. Furthermore, an interference may also be detected across a partial frequency range or the entire frequency range of a modulation. In particular, interferences may be differentiated from actual targets even within the frequency range, in which targets usually occur, with the aid of the modulation- and/or frequency-dependent reception power threshold value. Furthermore, the present invention offers the possibility of detecting any type of interferences in the admissible frequency range.

These interferences may, for example, be caused by other FMCW radar systems, FSK, step FMCW, chirp and/or pulsed radar systems, as well as other radar systems.

Furthermore, a set of frequency-dependent reception power threshold values for a known modulation may be determined once and then stored. It is then possible to detect an interference by effortlessly and very quickly comparing the reception power for a certain frequency to the reception power threshold value which is indicated for this frequency by the set of frequency-dependent reception power threshold values.

A set of frequency-dependent reception power threshold values for a certain modulation slope may, for example, be determined with the aid of the FMCW equation, the general radar equation, or a conditional equation derived from one of these equations.

A set of frequency-dependent reception power threshold values may not only be determined as a function of a certain modulation slope. The set of frequency-dependent reception power threshold values may also be determined, for example, as a function of a relative speed range and/or of a target distance range and/or for a maximally expected radar backscatter cross section of objects which are to be detected with the aid of the radar. For this purpose, a weighting between the recognition accuracy of interferences and the likelihood of a false alarm regarding the interference recognition may be performed when determining the set of reception power threshold values. It is, in particular, possible to illustrate a set of the frequency-dependent reception power threshold values according to the present invention as a curve in a diagram.

In one specific embodiment, the interference detector has an evaluation unit, which is designed to determine the reception power and the frequency of the received radar signals, a threshold value unit, which is designed to determine at least one frequency-dependent reception power threshold value based on the certain frequency and the particular modulation parameters, and a comparison unit which is designed to compare the determined reception power threshold value to the reception power of the received radar signals and to indicate the presence of an interference if the reception power is greater than the reception power threshold value. In another specific embodiment, the threshold value unit is designed to determine the frequency-dependent reception power threshold value based on the certain frequency from a set of frequency-dependent reception power threshold values corresponding to the particular modulation parameters.

In another specific embodiment, the modulation parameters also have a transmission power of the transceiver unit and/or an antenna output of the transceiver unit and/or a maximally occurring radar backscatter cross section of expected objects and/or a speed at which the FMCW radar system moves and/or data of previously detected objects, such as relative speed and/or distance. If other modulation parameters are used to determine the frequency-dependent reception power threshold value, the tolerance for detecting an interference may be significantly reduced. In this way, interferences are detected more reliably and the likelihood of a false alarm is reduced. This increases the availability and the quality of the object recognition of the FMCW radar system.

In one specific embodiment, the threshold value unit is designed to also determine the reception power threshold value based on an installation situation of the transceiver unit. Additionally or alternatively, the threshold value unit is designed to also determine the reception power threshold value based on a transceiver characteristic of the transceiver unit. The transceiver characteristic of the transceiver unit influences the reception power of the FMCW radar system and depends on the particular electrical as well as mechanical construction and the installation situation of the FMCW radar system. If the installation situation and the transceiver characteristic are taken into account when determining the reception power threshold value, the accuracy of the interference recognition is further increased. The influences, which the installation situation and the transceiver characteristic have on the particular reception power threshold values, may be ascertained in simulations or may be determined through measurements at the actual FMCW radar system.

In one specific embodiment, a first memory is provided in which for each set of reception power threshold values at least two reception power threshold values are stored for any differing frequencies, the interference detector being designed to interpolate a reception power threshold value for frequencies for which no reception power threshold value is stored based on the at least two stored reception power threshold values. If only a selection of reception power threshold values of one set of reception power threshold values is stored, it is possible to store the particular set in a very efficient manner. In this case, storing fewer reception power threshold values of a set of reception power threshold values reduces the memory requirements for storing the particular set to a fraction of the memory necessary to store the entire set. Due to the interpolation, the possibility is maintained to determine a reception power threshold value for any frequency of a modulation.

In one specific embodiment, a second memory is provided in which, for a plurality of sets of reception power threshold values, at least two reception power threshold values for any differing frequencies are stored in each case in one characteristics field. If the reception power threshold values for different sets of reception power threshold values are stored in one characteristics field in one single memory, a particularly efficient access to the individual reception power threshold values is possible. In particular, the sets of reception power threshold values may be stored in the characteristics field according to the sequence in which the modulations corresponding to the individual sets are transmitted by the FMCW radar system. The memory locations of the subsequent set of the reception power threshold values may then be accessed by simply adding an offset to an index to the reception power threshold values.

The above-mentioned embodiments and refinements may be combined in any desired manner, provided that the combination is reasonable. Other possible embodiments, refinements, and implementations of the present invention also include not explicitly named combinations of features of the present invention described previously or in the following with regard to the exemplary embodiments. In particular, those skilled in the art will add individual aspects as improvements or enhancements to the particular base form of the present invention.

BRIEF DESCRIPTION OF THE DRAWINGS

The present invention is explained below in greater detail with reference to the exemplary embodiments shown in the figures.

DETAILED DESCRIPTION OF EXAMPLE EMBODIMENTS

Figure 1:
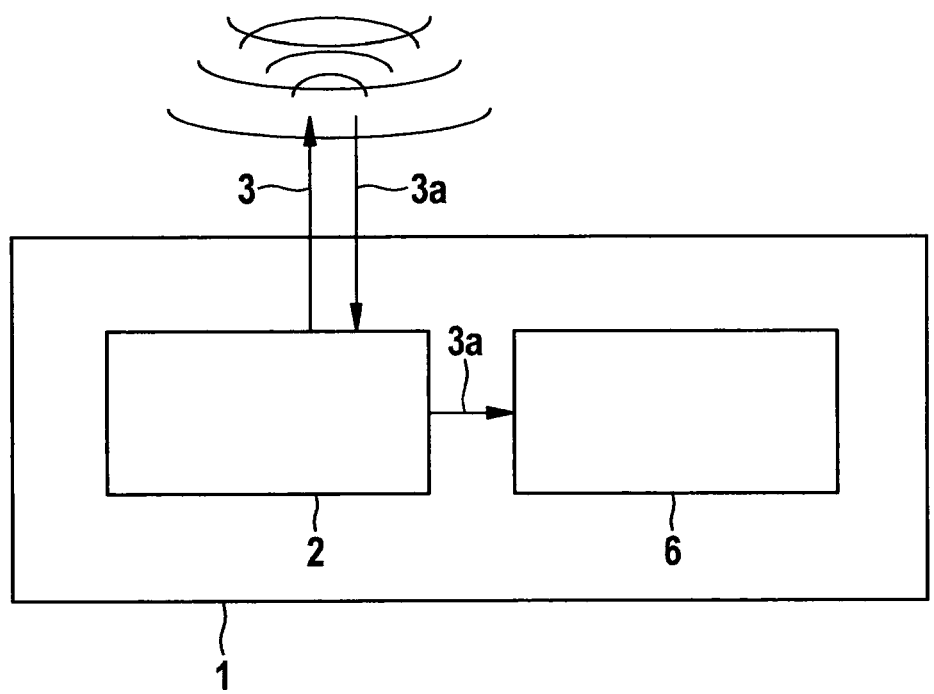
FIG. 1 shows a block diagram of one specific embodiment of an FMCW radar system according to the present invention.

In all figures, elements and devices which are identical or have identical functions are identified with identical reference numerals, unless otherwise indicated.

FIG. 1 shows a block diagram of one specific embodiment of an FMCW radar system 1 according to the present invention.

FMCW radar system 1 has a transceiver unit 2 which transmits radar signals 3 and receives radar signals 3a. Transmitted radar signals 3 are modulated with the aid of predefined modulation parameters. Furthermore, transceiver unit 2 makes received radar signals 3a available to interference detector 6 which detects interferences in received radar signals 3a based on at least one frequency-dependent reception power threshold value 8 corresponding to the particular modulation parameters.

Interference detector 6 is designed as a microcontroller 6 which converts received radar signals 3a into digital data with the aid of analog/digital converters and detects interferences in received radar signals 3a.

In other specific embodiments, interference detector 6 is designed as an embedded computer, as an application-specific integrated circuit (ASIC), as a programmable logic component or the like.

Figure 2:
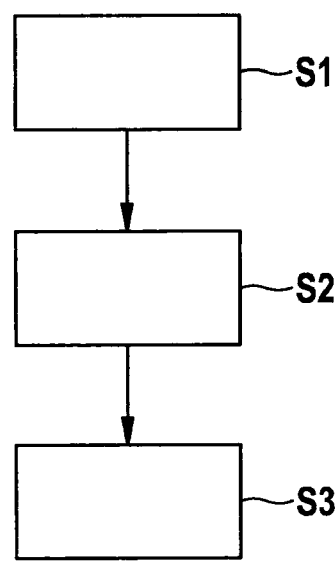
FIG. 2 shows a flow chart of one specific embodiment of an interference recognition method according to the present invention.

FIG. 2 shows a flow chart of one specific embodiment of an interference recognition method according to the present invention.

In FIG. 2, an FMCW radar system 1 according to the present invention is made available in a first step S1. In a second step S2, radar signals 3 are transmitted which are modulated with the aid of at least one modulation parameter. Transmitted radar signals 3 which are reflected from objects are received in a third step S3. In a fourth step S4, interferences are detected in received radar signals 3a based on at least one frequency-dependent reception power threshold value 8 corresponding to the particular modulation parameters. Steps S3 and S4 may run simultaneously in one specific embodiment.

Interferences are detected in another specific embodiment in particular by comparing the value of the reception power of received radar signals 3a to a corresponding reception power threshold value 8. For this purpose, reception power threshold value 8 is taken from the set of reception power threshold values 8 at the location corresponding to the frequency of the received radar signal 3a. For this purpose, a set of reception power threshold values 8 is made available for each variant of modulation parameters used by FMCW radar system 1. In another specific embodiment, the individual sets of reception power threshold values 8 are stored in the memory in the form of one single characteristics field.

In one specific embodiment, the individual sets of reception power threshold values 8 may be calculated based on the FMCW equation, for example. In other specific embodiments, the sets of reception power threshold values may be calculated with the aid of the general radar equation or calculation specifications derived therefrom. In yet other specific embodiments, the sets of reception power threshold values may be determined experimentally, or the calculated sets of reception power threshold values may be adjusted to the particular application based on experimental studies.

In other specific embodiments, a set of reception power threshold values may be determined in real time by threshold value unit 7 and/or adjusted as a function of other data. These data may, for example, be a speed of a vehicle having FMCW radar system 1 or a speed of an FMCW radar system 1, data of detected objects, e.g., relative speed and distance, transmission power of the transceiver unit or the like.

Figure 3:
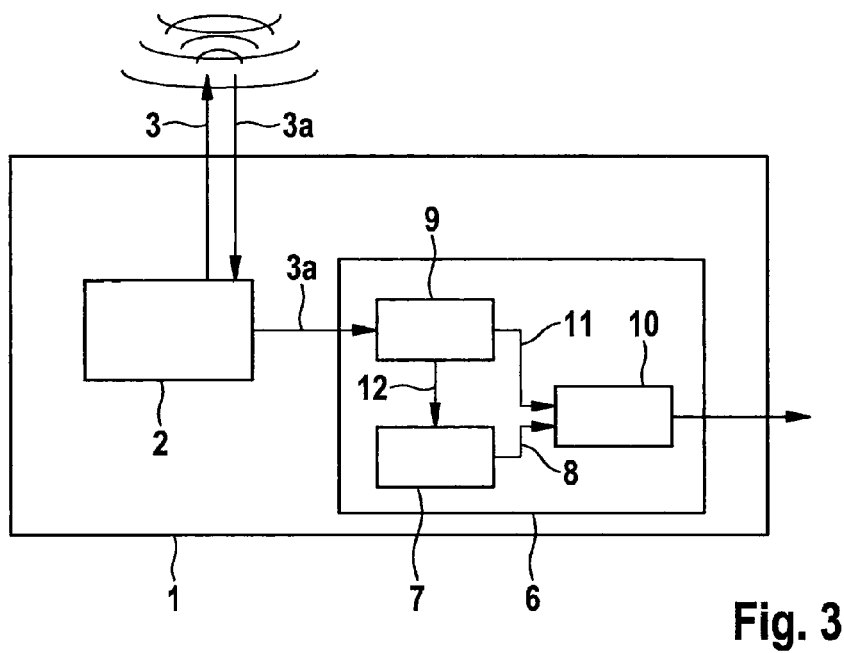
FIG. 3 shows a block diagram of another specific embodiment of an FMCW radar system according to the present invention.

FIG. 3 shows a block diagram of another specific embodiment of an FMCW radar system 1 according to the present invention.

The block diagram in FIG. 3 differs from the block diagram in FIG. 1 in that interference detector 6 has an evaluation unit 9 which evaluates received radar signals 3a and makes available reception power 11 of received radar signals 3a to a comparison unit 10 as well as frequency 12 of received radar signals 3a to a threshold value unit 7. Threshold value unit 7 determines an appropriate reception power threshold value 8 for reception power 11 of received radar signals 3a at least based on a predefined modulation parameter and frequency 12. Comparison unit 10 then compares reception power 11 to reception power threshold value 8 and indicates an interference when reception power 11 exceeds reception power threshold value 8. For this purpose, threshold value unit 7 may read reception power threshold values 8 from a memory or calculate them in real time.

Figure 4:
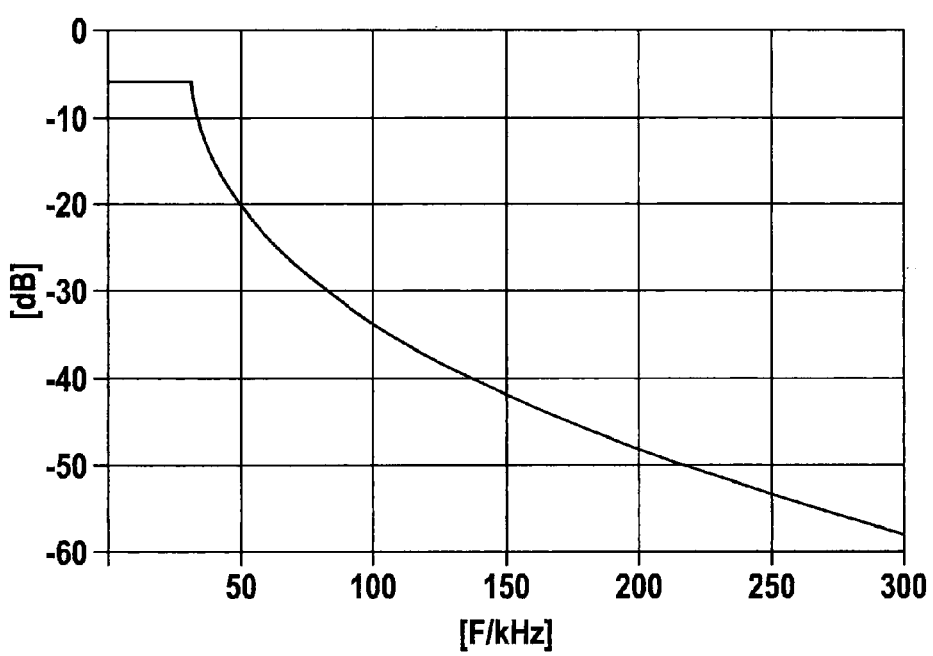
FIG. 4 shows a diagram of an exemplary specific embodiment of a set of reception power threshold values according to the present invention.

FIG. 4 shows a diagram of an exemplary specific embodiment of a set of the reception power threshold values according to the present invention.

In FIG. 4, a diagram of an exemplary set of reception power threshold values for a modulation slope of 400 MHz/ms is illustrated in the form of a threshold value curve. The diagram is further based on a radar backscatter cross section of 3000 $m^2$, a relative speed range from −75 m/s to +20 m/s, and a target distance from 1 m to 200 m.

In one specific embodiment of a radar system according to the present invention, the threshold value curve is stored in the form of a set of reception power threshold values. Here, the points of the threshold value curve in the set of reception power threshold values are stored as pairs of frequency and reception power. Here, the frequency distance of the pairs corresponds to the frequency resolution of the transceiver unit.

In the diagram, the frequency of received radar signal 3a is plotted on the abscissa. The plotted frequency starts at 0 kHz and ends at 300 kHz; steps of 50 kHz are indicated on the abscissa in each case. On the ordinate, the reception power is plotted in dB from 0 dB to −60 dB in 10 dB steps. Furthermore, a curve is plotted in the diagram. The curve proceeds from 0 Hz to approximately 40 kHz at approximately −8 dB. Subsequently, the curve drops to 300 kHz at an increasingly lower gradient up to approximately −57 dB.

The range above the upper curve is the range which is considered as the interference detection range. If a reception power, which is above the upper curve, is determined for a received radar signal 3a at a frequency it is assumed that an interference exists. If the reception power of received radar signals 3a is in the range below the curve, it may be assumed that an object is located in the recognition range of transceiver unit 2.

In one specific embodiment of the present radar system, the frequency-dependent reception power threshold values correspond to the upper curve of the diagram. In other specific embodiments, other curve variations are possible as a function of the modulation slope, other modulation parameters, and vehicle-specific parameters.

Although the present invention was described above with reference to preferred exemplary embodiments, it is not limited thereto, but is modifiable in many ways. In particular, the present invention may be changed or modified in various ways without deviating from the core of the present invention.

What is claimed is:

1. An FMCW radar system, comprising:
   a transceiver unit configured to transmit radar signals which are modulated according to at least one modulation parameter, and to receive radar signals which are reflected from objects; and
   an interference detector configured to detect interferences in the received radar signals based on a comparison of reception power of the received radar signals to at least one frequency-dependent reception power threshold value, wherein the at least one frequency-dependent reception power threshold value is set based on the at least one modulation parameter, and wherein the at least one modulation parameter is a modulation slope.

2. The FMCW radar system as recited in claim 1, wherein the interference detector has an evaluation unit configured to determine reception power and frequency of the received radar signals, a threshold value unit configured to determine the at least one frequency-dependent reception power threshold value based on a frequency from a set of the frequency-dependent reception power threshold values, and a comparison unit to compare the determined reception power threshold value to the reception power of the received radar signals and to indicate a presence of an interference if the reception power is greater than the reception power threshold value.

3. The FMCW radar system as recited in claim 2, further comprising:
 a memory in which at least two reception power threshold values are stored, wherein the interference detector is configured to interpolate a reception power threshold value for frequencies, for which no reception power threshold value is stored, based on the at least two stored reception power threshold values.

4. The FMCW radar system as recited in claim 2, further comprising:
 a memory in which at least two sets of reception power threshold values are stored in one characteristic field, each set of reception power threshold values including at least two reception power threshold values.

5. An interference recognition method for a FMCW radar system, comprising:
 providing an FMCW radar system, the system including a transceiver unit configured to transmit radar signals which are modulated according to at least one modulation parameter, and to receive radar signals which are reflected from objects, and an interference detector configured to detect interferences in the received radar signals based on a comparison of reception power of the received radar signals to at least one frequency-dependent reception power threshold value;
 transmitting, by the transceiver unit, the radar signals which are modulated according to at least one modulation parameter;
 receiving, by the transceiver unit, the radar signals which are reflected from objects; and
 detecting, by the interference detector, interferences in the received radar signals based on a comparison of reception power of the received radar signals to the at least one frequency-dependent reception power threshold value, wherein the at least one frequency-dependent reception power threshold value is set based on the at least one modulation parameter, and wherein the at least one modulation parameter is a modulation slope.

6. The interference recognition method as recited in claim 5, further comprising:
 determining a reception power and a frequency of the received radar signals to detect interferences;
 determining a frequency-dependent reception power threshold value from a set of frequency-dependent reception power threshold values;
 comparing the reception power threshold value to the reception power of the received radar signals; and
 indicating an interference if the reception power is greater than the reception power threshold value.

7. The interference recognition method as recited in claim 6, wherein at least two reception power threshold values are stored in a memory, and one reception power threshold value is interpolated for frequencies for which no reception power threshold value is stored based on the at least two stored reception power threshold values.

8. The interference recognition method as recited in claim 6, wherein at least two sets of reception power threshold values are stored in one characteristic field, each set of reception power threshold values including at least two reception power threshold values.

* * * * *